United States Patent [19]
Yumura et al.

[11] Patent Number: 5,027,340
[45] Date of Patent: Jun. 25, 1991

[54] OBJECT LENS HEAD ASSEMBLY

[75] Inventors: Takashi Yumura; Tetsu Yamamoto, both of Amagasaki, Japan

[73] Assignee: Mitsubishi Denki Kabushiki Kaisha, Japan

[21] Appl. No.: 360,224

[22] Filed: Jun. 1, 1989

[51] Int. Cl.⁵ ............................................. G11B 17/30
[52] U.S. Cl. ..................................... 369/219; 369/215; 369/32
[58] Field of Search ....................... 369/215, 32, 44.11, 369/44.37, 44.38, 44.24, 44.26, 44.14, 109–112, 13, 219–221, 264, 270, 271, 30; 360/104–106, 78.01, 78.04, 78.05

[56] References Cited

U.S. PATENT DOCUMENTS

| 4,025,731 | 5/1977 | Rembault | 369/109 X |
| 4,235,507 | 11/1980 | Kataoka et al. | 369/112 X |
| 4,495,609 | 1/1985 | Russell | 369/44.38 X |
| 4,507,763 | 3/1985 | Kato | 369/44.26 |
| 4,568,142 | 2/1986 | Iguma | 369/44.16 X |
| 4,638,471 | 1/1987 | van Rosmalen | 369/44.24 X |
| 4,661,941 | 4/1987 | Bell et al. | 369/110 X |
| 4,733,065 | 3/1988 | Hoshi et al. | 369/112 X |
| 4,742,506 | 3/1988 | Fukumoto et al. | 369/44.37 |
| 4,823,219 | 4/1989 | Ueda et al. | 360/106 |
| 4,835,752 | 5/1989 | Nakatsu et al. | 369/32 |
| 4,841,507 | 6/1989 | Imai et al. | 369/44 |
| 4,856,108 | 8/1989 | Tinet | 369/44.26 |
| 4,895,696 | 7/1989 | Ohtsuki et al. | 369/13 |

Primary Examiner—William M. Shoop, Jr.
Assistant Examiner—David Martin
Attorney, Agent, or Firm—Leydig, Voit & Mayer

[57] ABSTRACT

An object lens head assembly for use with an optical recording disc comprises an information conversion apparatus for receiving an electrical signal bearing information to be written to the disc and outputting beams of light bearing the information to be written to the disc, and for receiving a beam of light bearing information read from the disc and outputting an electrical signal bearing the information read from the disc; a plurality of object lenses disposed along a diametrical direction of the disc for directing light onto a plurality of portions of the disc, respectively; a plurality of reflective mirrors for reflecting the light beam output from the information conversion apparatus toward a selected one of the object lenses; a linear motor for moving the object lenses along the diametrical direction of the disc; and a light beam shifting mechanism for shifting the light beam so that the light beam impinges upon a selected one of the reflective mirrors.

5 Claims, 2 Drawing Sheets

OBJECT LENS HEAD ASSEMBLY

BACKGROUND OF THE INVENTION

This invention relates to an object lens head assembly and more particularly to a mechanism for positioning an object lens relative to an optical recording disc used in an optical disc apparatus.

FIGS. 1 to 3 illustrate one example of a related optical head assembly or a mechanism for positioning an object lens to which the present invention may be applied and which is disclosed in U.S. Pat. No. 4862441 (Japanese Patent application No. 61-120074). FIG. 1 is a plan view of the object lens head assembly, FIG. 2 is a sectional view taken along line II—II of FIG. 1, and FIG. 3 is a side view of the object lens head assembly with an information conversion apparatus omitted.

In these figures, reference numeral 1 designates a magnetic circuit of a linear motor for reciprocatingly driving an object lens in the radial direction (the direction of an arrow A) of a disc 11 shown in partial cut-away view, 2 is a drive coil, 3 is a coil bobbin, 4 is a transducer shown as an information conversion apparatus for the conversion between the information in an electrical signal and the information in a light beam, 5 is a reflective mirror for reflecting the light beam generated from the information conversion apparatus 4 toward an object lens 6 which is for collecting the light beam, 7 is an actuator for positioning the object lens 6 along a direction perpendicular to the disc for accurately collecting the light beam to produce a light spot on the disc 11, and 9 is the light beam.

With this object lens head assembly, the object lens 6 and the reflective mirror 5 are positioned in the radial direction of the disc 11 (direction of the arrow A) by the linear motor. The light beam 9 generated from the information conversion apparatus 4 is reflected by the reflective mirror 5 to perpendicularly impinge upon the object lens 6, where it is collected to form a light spot on the disc surface. At this time, the actuator 7 positions the object lens 6 in the direction perpendicular to the disc 11 so that the light spot is accurately formed on the disc surface.

Since the above-described object lens head assembly is provided with only a single object lens, the object lens must move over a complete stroke which corresponds to the width dimension of the information recording area of the disc or the radial dimension of the area in which recording tracks are formed. Therefore, a large-sized linear motor having a large drive force must be used in order to shorten the access time, resulting in a large-sized optical head assembly.

SUMMARY OF THE INVENTION

Accordingly, one object of the present invention is to provide an object lens head assembly for use with an optical recording disc which exhibits a quick access time.

Another object of the present invention is to provide an object lens head assembly which is compact.

Another object of the present invention is to provide an object lens head assembly which exhibits a quick acess time and which is yet compact in size.

With the above objects in view, the object lens head assembly for use with an optical recording disc according to the present invention comprises an information conversion apparatus for converting information between electrical signal information and light beam information, a plurality of object lenses disposed along a diametrical direction of the disc for collecting the light beam onto the disc, a reflective mirror for reflecting the light beam generated from the information conversion apparatus toward either of the object lenses, a linear motor for moving the object lenses along the diametrical direction of the disc and a light beam shifting mechanism for shifting the light beam so that the light beam selectively impinges upon either of the reflective mirrors.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENT

Figure 1:
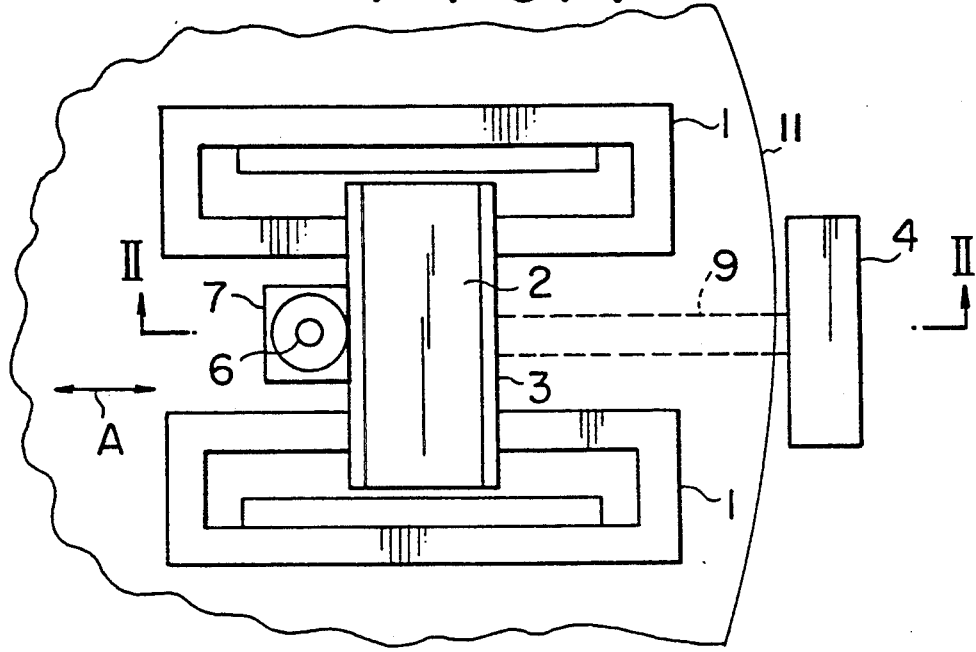
FIG. 1 is a plan view of the object lens head assembly to which the present invention can be applied.
Figure 2:
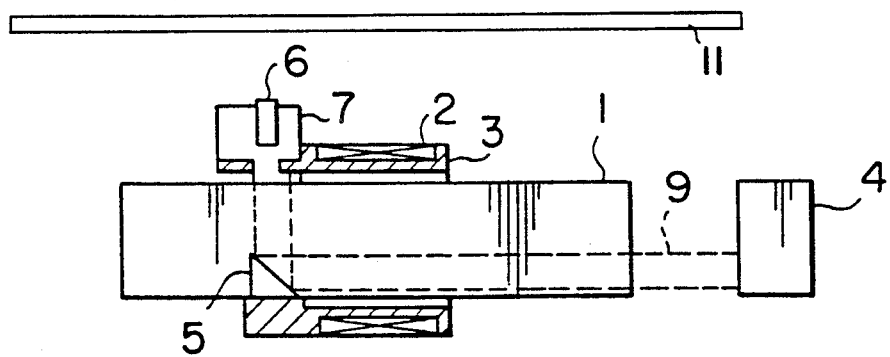
FIG. 2 is a sectional view taken along line II—II of FIG. 1.
Figure 3:
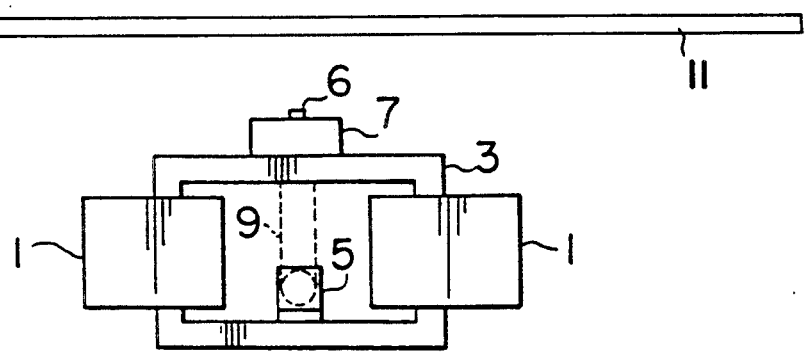
FIG. 3 is a side view of the object lens head assembly shown in FIG. 1 with an information conversion apparatus omitted for simplicity of the illustration.
Figure 4:
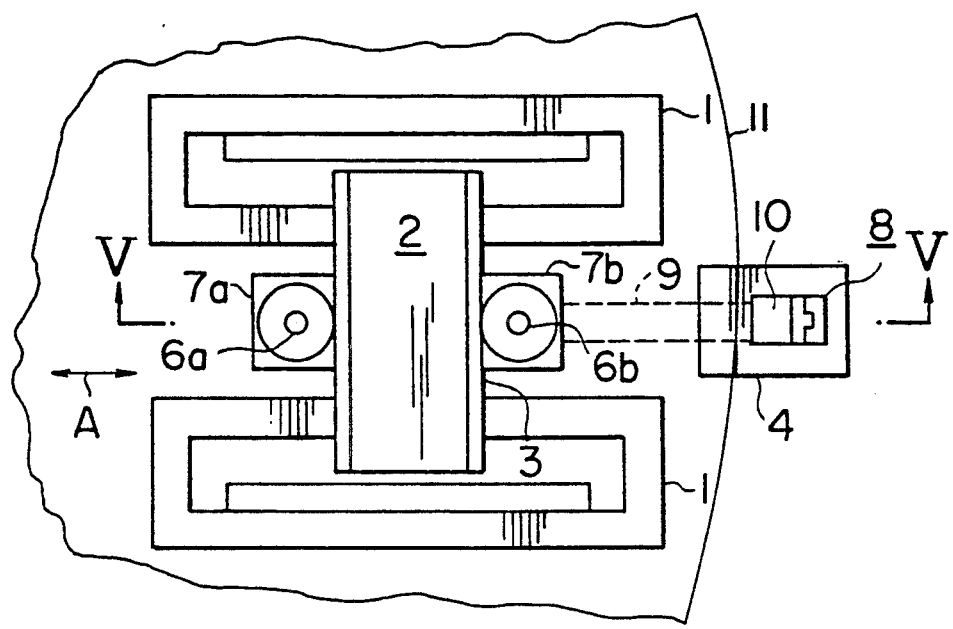
FIG. 4 is a plan view of the object lens head assembly of the present invention.
Figure 5:
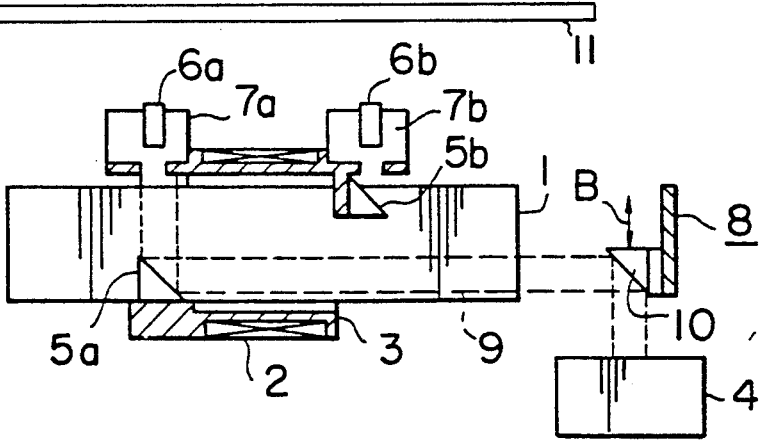
FIG. 5 is a sectional view taken along line V—V of FIG. 4.
Figure 6:
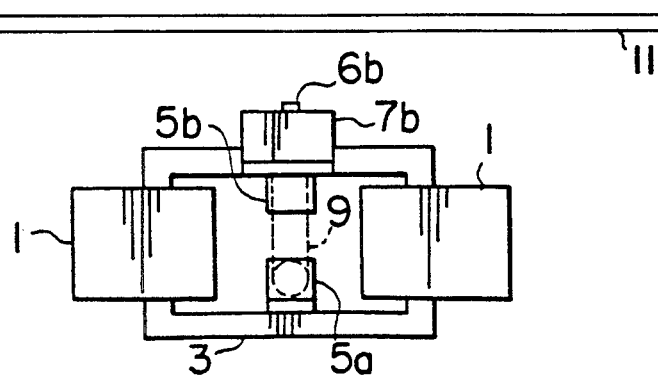
FIG. 6 is a side view of the object lens head assembly shown in FIG. 4 with an information conversion apparatus omitted for simplicity of the illustration.

In FIGS. 4 to 6, reference numeral 1 designates a magnetic circuit of a linear motor for reciprocatingly driving an object lens in the radial direction (the direction of an arrow A) of a disk 11 shown in partial cut-away view, 2 is a drive coil, 3 is a coil bobbin, 4 is an information conversion apparatus for the conversion of the information between the information in the form of an electrical signal and the information in the form of a light beam, 5a and 5b are reflective mirrors for reflecting the light beam generated from the information conversion apparatus 4 toward object lenses 6a and 6b, respectively, 7a and 7b are actuators for positioning the object lenses 6a and 6b along a direction perpendicular to the disc 11 for accurately collecting the light beam to produce a light spot on the disc 11, 8 is a light beam shifting mechanism including a reflective mirror 10 for shifting a light beam 9 generated from the information conversion apparatus 4 in the direction perpendicular to the disc 11 (the direction of an arrow B). The reflective mirrors 5a and 5b as well as the light beam shifting mechanism 8 constitute reflective mirror means for reflecting the light beam generated from the information conversion apparatus 4 toward either one of the objective lenses 6a and 6b. In the illustrated embodiment, two object lenses 6a and 6b are spaced in a radial direction of the disc 11.

In the object lens head assembly as above-described construction, the object lenses 6a and 6b as well as the reflective mirrors 5a and 5b are selectively positioned by the linear motor in the radial direction of the disc 11. Two object lenses 6a and 6b are mounted to the coil bobbin 3 with a space corresponding to one half of the stroke (width of the recording area of the disc 11) therebetween, so that when the coil moves by one half of the stroke, the object lens 6a moves from the innermost circumference of the track area to the middle of the stroke and the object lens 6b moves from the middle of the stroke to the outermost circumference of the track area. The light beam 9 generated from the information conversion apparatus 4 is reflected and shifted in the direction perpendicular to the disc 11 (in the direction of the arrow B) by the light beam shifting device 8 so that the light beam 9 is directed to either one of the reflective mirrors 5a and 5b, thereby causing the light beam 9 to impinge upon either one of the desired object lenses 6a and 6b. In the illustrated example, the object lens 6a is shown as being selected. The object lens 6a is positioned by the actuator 7a in the direction perpendicular to the disc 11 so that an accurate light spot is formed on the disc 11 by the object lens 6a. The light spot for writing-in an information in an electrical signal is thus formed on the disc surface. During reading out of the information also, a weak light beam is directed through the above light path toward the disc surface and the light beam reflected from the disc surface is directed through the same light path back to the information conversion apparatus 4 where the reflected light beam is converted into an electrical signal. Therefore, the radial distance, through which the coil for holding the object lenses 6a and 6b is required to move for writing and reading the information on all the tracks extending from the innermost track to the outermost track, can be only one half of the radial distance required in the previous design of the optical head assembly in which only one object lens is provided. Therefore, the access time can be shortened.

While the present invention has been described in terms of a preferred embodiment of the invention, many modifications may be applied. For example, the reflective mirrors 5a and 5b may be disposed at circumferentially spaced positions on the disc surface and the light beam shifting apparatus 8 may be arranged to move the light beam 9 in the circumferential direction of the disc 11 so that the light beam may be directed toward either one of the circumferentially spaced reflective mirrors 5a and 5b. Also, the reflective mirrors 5a and 5b may be positioned at two different positions spaced in both the circumferential and radial directions of the disc 11.

Also, the plurality of reflective mirrors may be disposed along the light path of a single light beam, and the reflective mirror in front of the reflective mirror at which the light beam should be reflected to direct the beam toward the object lens may be arranged rotatable to be withdrawn from the light path so that only the desired reflective mirror can be used. Alternatively, the plurality of reflective mirrors may be arranged such that they are concurrently illuminated by a common light beam and that only the necessary mirror can be selectively exposed to the light beam. Further, the number of the object lenses and the reflective mirrors may be changed.

As has been described, according to the present invention, the object lens head assembly for use with an optical recording disc comprises information conversion means for conversion between electrical signal information and light beam information, a plurality of object lenses disposed along a diameter of the disc for collecting the light beam onto the disc, reflective mirror means for reflecting the light beam generated from the information conversion means toward either of the object lenses, and a linear motor for moving the object lenses along the diametrical direction of the disc. Accordingly, the object lens head assembly of the present invention can be made very quick in access time and yet compact in size.

What is claimed is:

1. An object lens head assembly for use with an optical recording disc comprising:

a linear motor disposed adjacent to a face of the optical recording disc and movable in a direction parallel to the face of the disc;

first and second object lenses mounted on said linear motor to move therewith over first and second portions, respectively, of the face of the disc;

first and second reflective mirrors mounted on said linear motor to move therewith along first and second paths, respectively, said first and second reflective mirrors being disposed in attitudes such that:

(a) beams of light bearing information to be written onto the disc travelling along the first and second paths are reflected by said first and second mirrors, respectively, through said first and second object lenses onto the first and second portions of the disc, respectively, and (b) beams of light bearing information read from the disc passing from the first and second portions of the disc through said first and second object lenses are reflected by said first and second mirrors, respectively, onto said first and second paths, respectively;

a transducer for receiving an electrical signal bearing information to be written to the disc and outputting a beam of light bearing the information to be written and for receiving a beam of light bearing information read from the disc and outputting an electrical signal bearing the information read; and a light beam shifting mechanism for directing the beam of light from said transducer bearing information to be written onto a selected one of the first and second paths, and for directing a beam of light bearing information read from the disc traveling along a selected one of the first and second paths to said transducer.

2. An object lens head assembly as recited in claim 1 wherein said light beam shifting mechanism includes a third reflective mirror movable between:

(a) a first position wherein the beam of light bearing the information to be written is reflected by said third mirror onto the first path and the beam of light reflected by said first mirror onto the first path is reflected by said third mirror to be received by said transducer, and (b) a second position wherein the beam of light bearing the information to be written is reflected by said third mirror onto the second path and the beam of light reflected by said second mirror onto the second path is reflected by said third mirror to be received by said transducer.

3. An object lens head assembly as claimed in claim 1, wherein said first and second reflective mirrors are disposed at positions spaced apart from each other in a direction perpendicular to said disc, and said light beam shifting mechanism shifts said light beam in a direction perpendicular to said disc.

4. An object lens head assembly as claimed in claim 1, wherein said first and second reflective mirrors are disposed at positions spaced apart from each other in a direction circumferential to said disc, and said light beam shifting mechanism shifts said light beam in a direction circumferential to said disc.

5. An object lens head assembly as claimed in claim 1, wherein said first and second reflective mirrors are disposed at positions spaced apart from each other in a direction perpendicular to and circumferential to said disc, and said light beam shifting mechanism shifts said light beam in a direction perpendicular to and circumferential to said disc.

* * * * *